United States Patent
Liang et al.

(10) Patent No.: US 12,513,586 B2
(45) Date of Patent: Dec. 30, 2025

(54) METHODS AND SYSTEMS FOR MULTICAST DATA FORWARDING DURING MOBILITY PROCEDURES IN WIRELESS COMMUNICATION NETWORKS

(71) Applicant: ZTE Corporation, Guangdong (CN)

(72) Inventors: Shuang Liang, Shenzhen (CN); Zijiang Ma, Shenzhen (CN); Zhendong Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 413 days.

(21) Appl. No.: 18/057,044

(22) Filed: Nov. 18, 2022

(65) Prior Publication Data

US 2023/0081286 A1 Mar. 16, 2023

Related U.S. Application Data

(63) Continuation of application No. PCT/CN2020/091021, filed on May 19, 2020.

(51) Int. Cl.
*H04W 76/12* (2018.01)
*H04W 36/00* (2009.01)
*H04W 36/02* (2009.01)

(52) U.S. Cl.
CPC ..... *H04W 36/026* (2013.01); *H04W 36/0007* (2018.08)

(58) Field of Classification Search
CPC ........... H04W 36/0007; H04W 36/026; H04W 36/0066; H04W 76/12; H04W 36/0061; H04W 36/0016; H04W 36/0011
See application file for complete search history.

(56) References Cited

U.S. PATENT DOCUMENTS 9,007,980 B2 4/2015 Kotecha et al.
2013/0301509 A1 11/2013 Purnadi et al.
(Continued)

FOREIGN PATENT DOCUMENTS

CN 109392004 A 2/2019
CN 110463231 A 11/2019
(Continued)

OTHER PUBLICATIONS

International Search Report and Written Opinion for International Application No. PCT/CN2020/091021, mailed on Sep. 14, 2020, 9 pages.
(Continued)

*Primary Examiner* — Anez C Ebrahim
(74) *Attorney, Agent, or Firm* — Perkins Coie LLP

(57) ABSTRACT

Methods, apparatus, and systems for providing multicast handover are disclosed. In one example aspect, the method includes receiving, by a first radio access node, a multicast flow comprising data packets of a multicast service, determining, by the first radio access node, whether to initiate a handover procedure for a user device from the first radio access node to a second radio access node, replacing, upon determination to initiate the handover procedure, by the first radio access node, a first portion of the data packets with a flow identifier of a unicast flow, and forwarding, by the first radio access node, the data packets of the multicast service including the flow identifier of the unicast flow to the second radio access node.

19 Claims, 11 Drawing Sheets

(56) References Cited

U.S. PATENT DOCUMENTS

| | | | |
|---|---|---|---|
| 2016/0316398 A1* | 10/2016 | Han | .............. H04W 36/0064 |
| 2019/0313295 A1 | 10/2019 | Xu et al. | |
| 2020/0084636 A1 | 3/2020 | Zhang et al. | |
| 2020/0178145 A1 | 6/2020 | Han et al. | |
| 2021/0092661 A1 | 3/2021 | Hu et al. | |
| 2023/0018193 A1* | 1/2023 | Zhong | .............. H04W 36/0007 |

FOREIGN PATENT DOCUMENTS

| | | |
|---|---|---|
| CN | 110636580 A | 12/2019 |
| CN | 110662270 | 1/2020 |
| EP | 4075866 A1 | 10/2022 |
| WO | 2015100733 A1 | 7/2015 |
| WO | 2015103746 A1 | 7/2015 |
| WO | 2019029643 A1 | 2/2019 |
| WO | 2019223005 A1 | 11/2019 |
| WO | 2019223780 A1 | 11/2019 |
| WO | 2019242749 A1 | 12/2019 |

OTHER PUBLICATIONS

Zte, "Solution for the Key issue#1 for the Architecture with BS-SC AF," 3GPP SA WG2 Meeting # S2-136AH, Incheon, South Korea, S2-2000937, 4 pages, Jan. 13-17, 2020.

Ericsson et al., "Introduction of SRVCC from 5G to 3G," 3GPP TSG RAN2 Meeting #109-e, Electronic meeting, RP-200350, 60 pages, Mar. 2020.

Qualcomm Incorporated et al., "Solution: Integrated Multicast and Unicast Transport with Full Separation of MBS Service," 3GPP SA WG2 Meeting #136-AH, Incheon, South Korea, S2-2001705, 7 pages, Jan. 13-17, 2020.

3GPP, "3rd Generation Partnership Project: Technical Specification Group Radio Access Network; NR; NR and NG-RAN Overall Description ; Stage 2 (Release 16)," 3GPP TS 38.300 V16.1.0, section 9.3.3, Apr. 8, 2020.

Extended European Search Report for European Patent Application No. 20895299.4, mailed Sep. 27, 2023 (11 pages).

3GPP, "3rd Generation Partnership Project; Technical Specification Group Services and System Aspects; Study on architectural enhancements for 5G multicast-broadcast services (Release 17)," 3GPP TR 23.757 V0.4.0.

Office Action for Japanese Patent Application No. 2022-570307, mailed Mar. 21, 2024, with English summary (5 pages).

Office Action for Chinese Patent Application No. 202080101015.0, mailed Feb. 14, 2025 (16 pages).

Office Action for Japanese Patent Application No. 2022-570307, mailed Aug. 16, 2024, with English summary (6 pages).

AT&T, "Status update on Rel-17 5MBS work in 3GPP and potential impacts on public safety," S6-200059, 3GPP TSG-SA6 Meeting #34, Hyderabad, India, Jan. 13-17, 2020 (3 pages).

Mediatek Inc. et al., "QoS Flow to DRB Remapping during DAPS HO," R2-1914612, 3GPP TSG-RAN WG2 Meeting #108, Reno, USA, Nov. 18-22, 2019 (5 pages).

Notification to Complete Formalities of Registration and Notification to Grant Patent Right for Invention with Search Report from Chinese application No. 2020801010150 mailed Jun. 30, 2025, 9 pages.

Wu Kejun, Research on Application Layer Multicast Routing in Ad Hoc Networks Based on Hierarchical Structure, Control and Measurement Technology, Apr. 18, 2010, Issue 4, pp. 1-36. 7 pages (English abstract only).

\* cited by examiner

700

710 Receive, by a first radio access node, a multicast flow comprising data packets of a multicast service

720 Determine, by the first radio access node, whether to initiate a handover procedure for a user device from the first radio access node to a second radio access node

730 Replace, upon determination to initiate the handover procedure, by the first radio access node, a first portion of the data packets with a flow identifier of a unicast flow

740 Forward, by the first radio access node, the data packets of the multicast service including the flow identifier of the unicast flow to the second radio access node

Receive, by a second radio access node, from a first radio access node, a multicast flow comprising data packets of a multicast service including a flow identifier for a user device during a handover procedure from the first radio access node — 810

Determine, by the second radio access node, whether the flow identifier indicates a flow for a multicast service — 820

Transmit, by the second radio access node, to a user device, the data packets of the multicast service through a unicast flow — 830

Receive, by a target radio access node, data packets of a multicast service in a handover procedure — 910

Determine, by the target radio access node, whether the data packets of the multicast service include a quality-of-service (QoS) flow identifier (QFI) indicating that the data packets are forwarded from a source radio access node — 920

Transmit, upon determination that the data packets include the QFI, by the target radio access node, the data packets to the mobile device in a unicast mode — 930

FIG. 9

METHODS AND SYSTEMS FOR MULTICAST DATA FORWARDING DURING MOBILITY PROCEDURES IN WIRELESS COMMUNICATION NETWORKS

CROSS REFERENCE TO RELATED APPLICATIONS

This patent document is a continuation of and claims benefit of priority to International Patent Application No. PCT/CN2020/091021, filed on May 19, 2020. The entire content of the before-mentioned patent application is incorporated by reference as part of the disclosure of this application.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, longer battery life, and improved performance are being discussed.

SUMMARY

This patent document describes, among other things, techniques for multicast data forwarding during mobility procedures that enable reliable delivery mode switching between unicast and multicast.

In one aspect, a data communication method includes receiving, by a first radio access node, a multicast flow comprising data packets of a multicast service, determining, by the first radio access node, whether to initiate a handover procedure for a user device from the first radio access node to a second radio access node, replacing, upon determination to initiate the handover procedure, by the first radio access node, a first portion of the data packets with a flow identifier of a unicast flow, and forwarding, by the first radio access node, the data packets of the multicast service including the flow identifier of the unicast flow to the second radio access node.

In another aspect, a data communication method includes receiving, by a second radio access node, from a first radio access node, a multicast flow comprising data packets of a multicast service including a flow identifier for a user device during a handover procedure from the first radio access node, determining, by the second radio access node, whether the flow identifier indicates a flow for a multicast service, and transmitting, by the second radio access node, to a user device, the data packets of the multicast service through a unicast flow.

In another aspect, a data communication method includes receiving, by a target radio access node, data packets of a multicast service in a handover procedure, determining, by the target radio access node, whether the data packets of the multicast service include a quality-of-service (QoS) flow identifier (QFI) indicating that the data packets are forwarded from a source radio access node, and transmitting, upon determination that the data packets include the QFI, by the target radio access node, the data packets to the mobile device in a unicast mode.

These, and other, aspects are described in the present document.

BRIEF DESCRIPTION OF DRAWINGS

FIG. 7 depicts an example of a process for wireless communication based on some example embodiments of the disclosed technology.

FIG. 8 depicts another example of a process for wireless communication based on some example embodiments of the disclosed technology.

FIG. 9 depicts another example of a process for wireless communication based on some example embodiments of the disclosed technology.

DETAILED DESCRIPTION

Certain features are described using the example of Fifth Generation (5G) wireless protocol. However, applicability of the disclosed techniques is not limited to only 5G wireless systems.

5G systems (5GS) include multicast/broadcast services. An aspect of these services is multi-cast discovery and the starting and ending of multicast services. User equipment (UEs) may simultaneously operate using unicast (also referred to as unicast) and multicast services. When a UE moves from one radio access network (RAN) node to another RAN node, service continuity of the broadcast and multicast services is needed. Disclosed herein are techniques for providing continuity of service for broadcast and multicast services.

In some example embodiments, a multicast service is a communications service in which the same service and the same content data are provided simultaneously to a set of authorized UEs (i.e., not all UEs in the multicast coverage are authorized to receive the data). A broadcast service is a communications service in which the same service and the same content data are provided simultaneously to all UEs in a geographical area (i.e., all UEs in the broadcast coverage area are authorized to receive the data).

Figure 1:
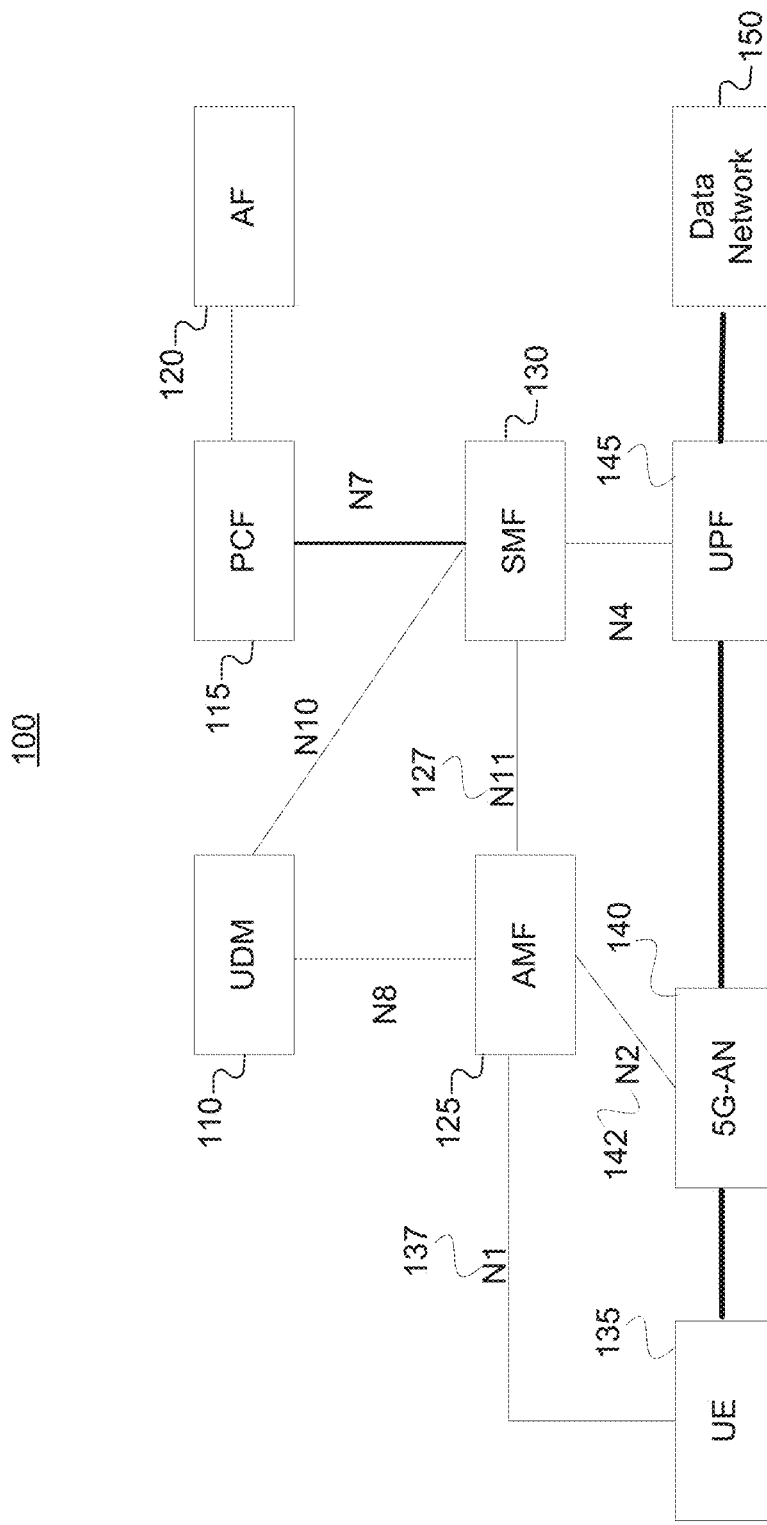
FIG. 1 depicts an architecture for a 5G system based on some example embodiments of the disclosed technology.

FIG. 1 depicts an example architecture 100 for a 5G system. The 5G System architecture consists of the network functions (NF) as well as other functions described below.

The access and mobility management function (AMF) 125 performs functions including UE mobility management, reachability management, connection management, and other functions. The AMF terminates the radio access network control plane (RAN CP) interface (also referred to as N2 interface 142) and non-access stratum (NAS) (also referred to as N1 interface 137), NAS ciphering and integrity protection. The AMF also distributes the session management (SM) NAS to the proper session management functions (SMFs) via the N11 interface 127.

The session management function (SMF) 130 includes user equipment (UE) internet protocol (IP) address allocation and management, selection and control of an UP function, PDU connection management, etc.

The user plane function (UPF) 145 is an anchor point for intra-/inter-radio access technology (RAT) mobility and the external protocol data unit (PDU) session point of interconnect to a data network. The UPF also routes and forwards data packets as indicated by the SMF, and the UPF buffers the downlink (DL) data when the UE is in idle mode.

The unified data management (UDM) 110 manages the subscription profiles for the UEs. The subscription includes the data used for mobility management (e.g., restricted area), session management (e.g., quality of service (QoS) profile per slice per data network name (DNN)). The subscription data also includes slice selection parameters which are used by the AMF to select an SMF. The AMF and SMF get the subscription from the UDM and the subscription data is stored in the unified data repository (UDR). The UDM uses the data upon receipt of a request from the AMF or SMF.

The policy control function (PCF) 115 governs network behavior based on the subscription and indication from the application function (AF) 120. The PCF provides policy rules to be enforced by the control plane (CP) functions such as the AMF and/or SMF. The PCF accesses the UDR to retrieve policy data.

A network exposure function (NEF) (not shown) may be included in the system for exchanging information between a core network (5GC) and an external third party. For example, the AF 120 may store the application information in the UDR via the NEF.

Multicast/broadcast multimedia subsystem (MBMS) was developed for video broadcasting and streaming services. Since its initial development, the MBMS system has been updated to support new services such as public safety, consumer internet of things (CIoT) and vehicle to everything (V2X). With the development and maturity of 5GS, 5GS is may provide multicast-broadcast services for vertical businesses.

Figure 2:
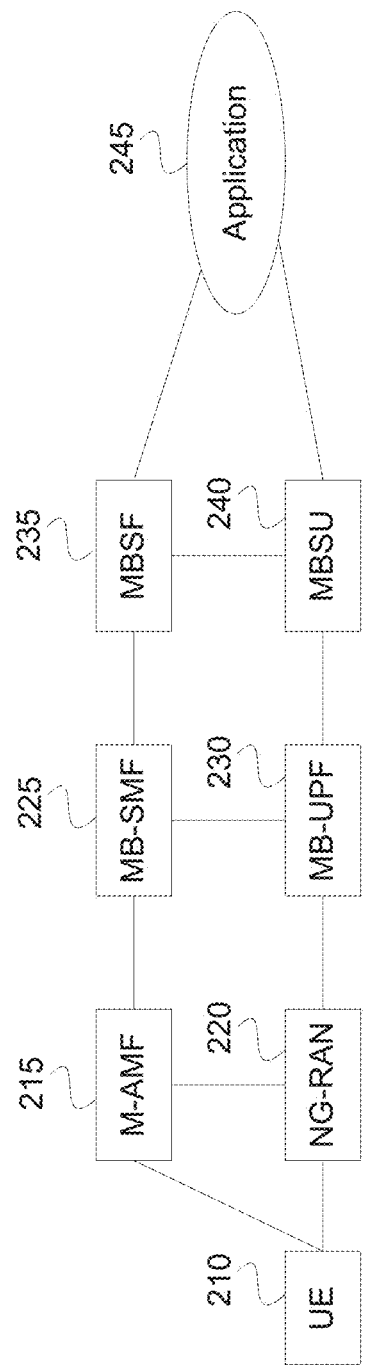
FIG. 2 depicts an enhanced 5G system architecture to provide broadcast/multicast services to a user equipment based on some example embodiments of the disclosed technology.

FIG. 2 depicts an example of an enhanced 5G system architecture 200 to provide broadcast/multicast services to a user equipment 230.

The multicast/broadcast service function (MBSF) 235 is a network function (NF) to handle a signaling part of a service layer capability and provides an interface to application server 245. It may be a standalone entity or collocated with an MB-SMF.

The multicast/broadcast service user plane (MB SU) 240 handles a payload part of the service layer capability and may be a standalone entity or collocated with the MBSF or MB-UPF.

The SMF and UPF may be enhanced to support the multicast/broadcast service. The AMF may also be enhanced to make transparent the signaling for multicast/broadcast service between the RAN/UE and multicast/broadcast-SMF (MB-SMF) 225.

Figure 3:
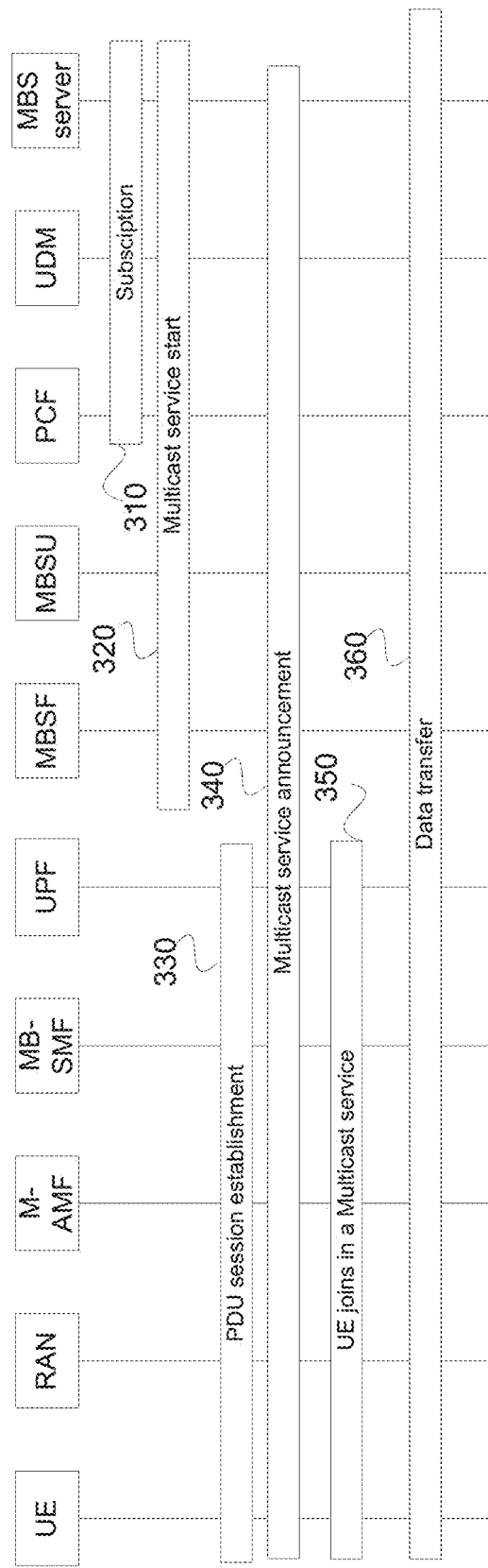
FIG. 3 depicts phases in a process for providing a multicast service based on some example embodiments of the disclosed technology.

FIG. 3 depicts examples of phases in a process for providing a multicast service.

At a service subscription phase 310, a subscription is the agreement of a user to receive service(s) offered by an operator. The relationship between the user and the service provider is established during the subscription. A relationship may be stored in the unified data repository (UDR) statically or pushed dynamically from the MBS server to the related PCF.

At a multicast service start phase 320, the MBS server triggers the MBSF to start the session to send multicast data. The MBSF triggers an MBS session establishment in 5GS. Session start occurs independently of activation of the service by the user (i.e., a given user may activate the service before or after session start). Session start is the trigger for bearer resource establishment for MBMS data transfer.

At a PDU session establishment phase 330, the UE may initiate a unicast PDU session establishment to retrieve a multicast service configuration or setup an association with the MBSF. This may occur before phase 310. The UE may subscribe to a multicast service dynamically via an established PDU session. This phase may also occur after phase 340 in a case where the multicast service starts before a UE joins the multicast service.

At a multicast service announcement phase 340, the multicast service announcement/discovery mechanisms allow users to request or to be informed of the range of available multicast services. The announcement is also used to distribute information to users about the services parameters required for service activation (e.g., IP multicast address(es)) and possibly other service-related parameters (e.g., service start time).

At a multicast joining phase 350, the UE initiates the joining process in order to become a member of a multicast group.

At data transfer phase 360, data is transferred to the UE.

Figure 4:
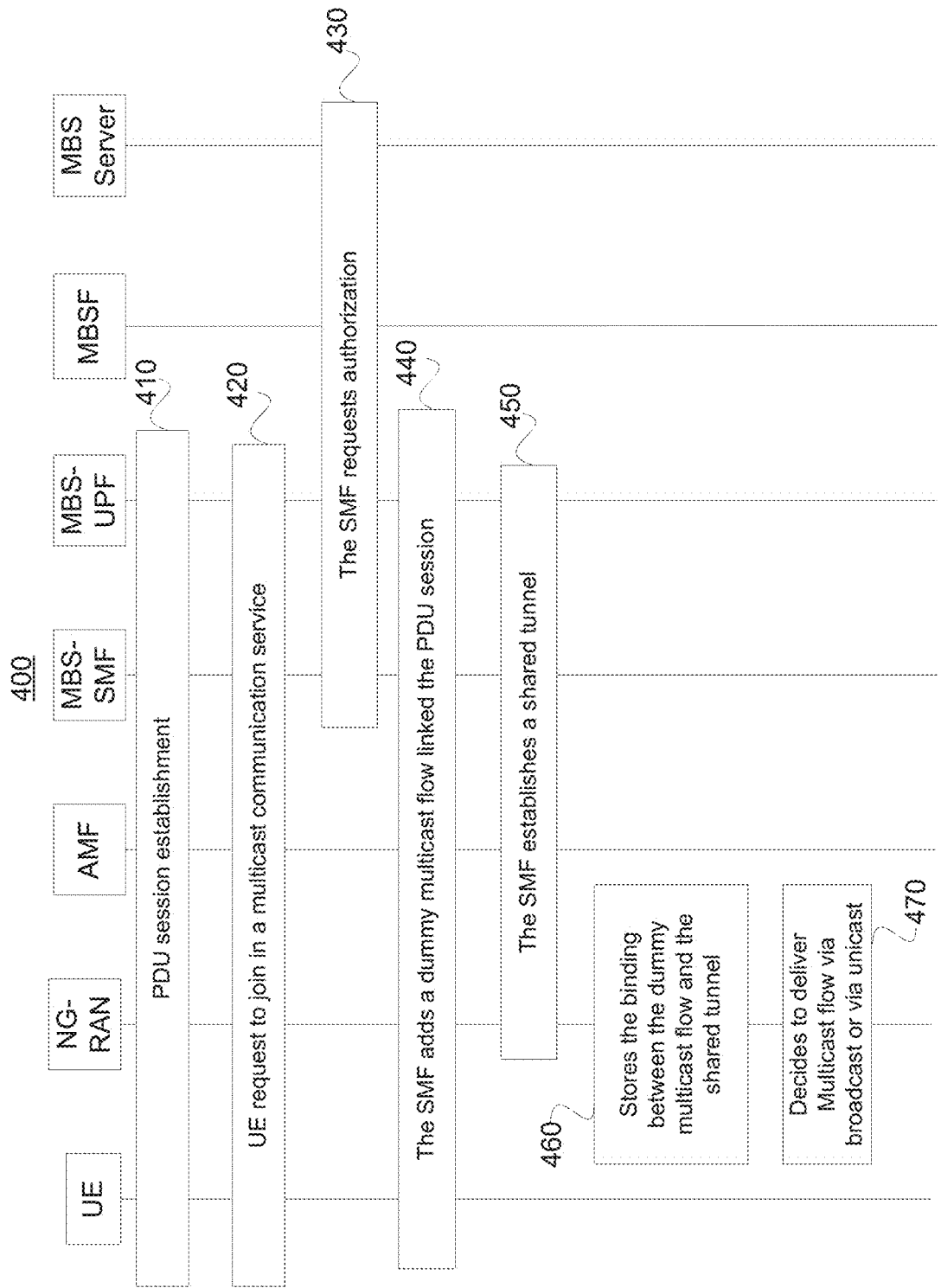
FIG. 4 depicts a process for establishing a shared tunnel to transfer a multicast service in a 5G system based on some example embodiments of the disclosed technology.

FIG. 4 depicts an example of a process for establishing a shared tunnel to transfer a multicast service in a 5G system. In some example embodiments, the process occurs after the UE has established a PDU session.

At 410, the UE initiates a unicast PDU session establishment process. During the process, an MBS-SMF supporting unicast and multicast is selected based on a specific DNN and single network slice selection assistance information (S-NSSAI). Upon completion of the establishment process, the UE may retrieve a multicast service configuration.

At 420, the UE initiates a joining request via UP data or NAS message to join a multicast communication service.

At 430, when the request is detected by the MB-SMF, the MB-SMF requests the MBSF to authorize the UE. The MBSF checks whether the UE is allowed to access the service. If it is, the MBSF checks whether a multicast context for the multicast group exists (i.e., whether a UE has already joined the multicast group). If the multicast context for the multicast group does not exist, then the SMF creates it when the first UE joins the multicast group. The check may involve the MBS server, PCF, and/or UDM. The MBS server may store the group membership in the UDM or send it to the PCF before the 430. Then the MBSF or MB-SMF may retrieve the information during the association establishment between the MBSF/MB-SMF and the PCF/UDM.

If there is no interaction between the MBSF and the PCF/UDM, the MBSF may retrieve the information from the MB-SMF.

At 440, the MBSF triggers the MB-SMF to establish a dummy QoS (quality-of-service) flow into an existing unicast PDU session or a new unicast PDU session.

At 450, the MBSF triggers the MB-SMF to establish an MBS flow via a shared tunnel for UEs that belong to the same multicast group under the same NG-RAN node. The dummy flow included in the unicast PDU session is not used to transfer multicast service data. The multicast service data is transferred via the MBS flow in the shared tunnel to the NG-RAN node. In some implementations, the session using the shared channel can be characterized as a multicast/broadcast service (MBS) session which includes one or more MBS QoS flows.

If there is a shared tunnel for the same multicast service, (i.e. other UEs have joined the multicast group via the NG-RAN node before this process), 450 may be skipped.

At 460, the NG-RAN node is provided the information from 440 and/or 450 to bind the shared tunnel and one or more dummy flows (e.g., one or more dummy flows can bind with one or more MBS flows in a shared tunnel) linked in the unicast PDU session. The information may include flow identifiers, and/or TMSI and/or session identifier.

If the dummy QoS flow is established within the existing unicast PDU session (i.e., PDU Session 1), the SMF allocates a QFI for the dummy QoS flow, and a QoS profile is also generated. The SMF may maintain a common QoS profile for the dummy flow and MBS QoS flow. In one example, the common QoS includes the QoS parameter (e.g. MGBR, 5QI, etc.), the QFI of the dummy flow, and the identity of the MBS flow. The identity of the MBS flow may include at least one of a TMGI, a multicast address, or a QFI of the MBS flow. The SMF may maintain two separate QoS profiles for the dummy flow and MBS flow. The QoS parameters included in such two QoS profiles are the same, but the identities of the dummy flow and MBS flow are different. The QoS parameters should be transferred to the NG-RAN.

At 470, when the NG-RAN node receives the multicast data in the shared tunnel, the NG-RAN may determine to deliver the multicast flow via a broadcast mode or a unicast mode on a radio interface. If the unicast mode is used, the dummy multicast flow is used for transferring the multicast flow via a dedicated data radio bearer (DRB) on the radio interface. If the broadcast mode is used, the UEs in the same group of such a multicast service receive the multicast data via a shared DRB on the radio interface.

When the UE moves to another RAN node, operations for the service continuity of the unicast service may be performed during the handover procedure. The embodiments of the disclosed technology can be implemented to provide techniques to ensure the service continuity of a multicast service of a mobile UE during the handover procedure.

In the context of this patent document, the word "dummy flow" is used to indicate a flow that is formed between the UE and the core network (5GC) in a certain situation via the radio access network (NG-RAN). The multicast service data is transferred not via the dummy flow between the NG-RAN and 5GC, but via the MBS flow included in MBS session using the shared tunnel between the NG-RAN and 5GC. The NG-RAN may not allocate a flow unless the 5GC informs the NG-RAN of the flow. Thus, when the NG-RAN decides to use a unicast mode on the radio interface, the NG-RAN can use QoS information of the dummy flow which has been generated and sent to the NG-RAN to schedule the radio resource and need not inform the 5GC of lack of flow information. The SMF may allocate a dummy flow and send to the NG-RAN, and the NG-RAN may use the dummy flow on the radio interface.

When moving from a source NG-RAN to a target NG-RAN in a handover scenario, a UE can receive the multicast service data from the source NG-RAN and the target NG-RAN separately. If both the source NG-RAN and target NG-RAN send the multicast service data to the UE in a broadcast mode, however, neither the source NG-RAN nor the target NG-RAN is responsible for ensuring the data transfer for each UE in the same group to avoid packet loss, affecting the service continuity.

Figure 5:
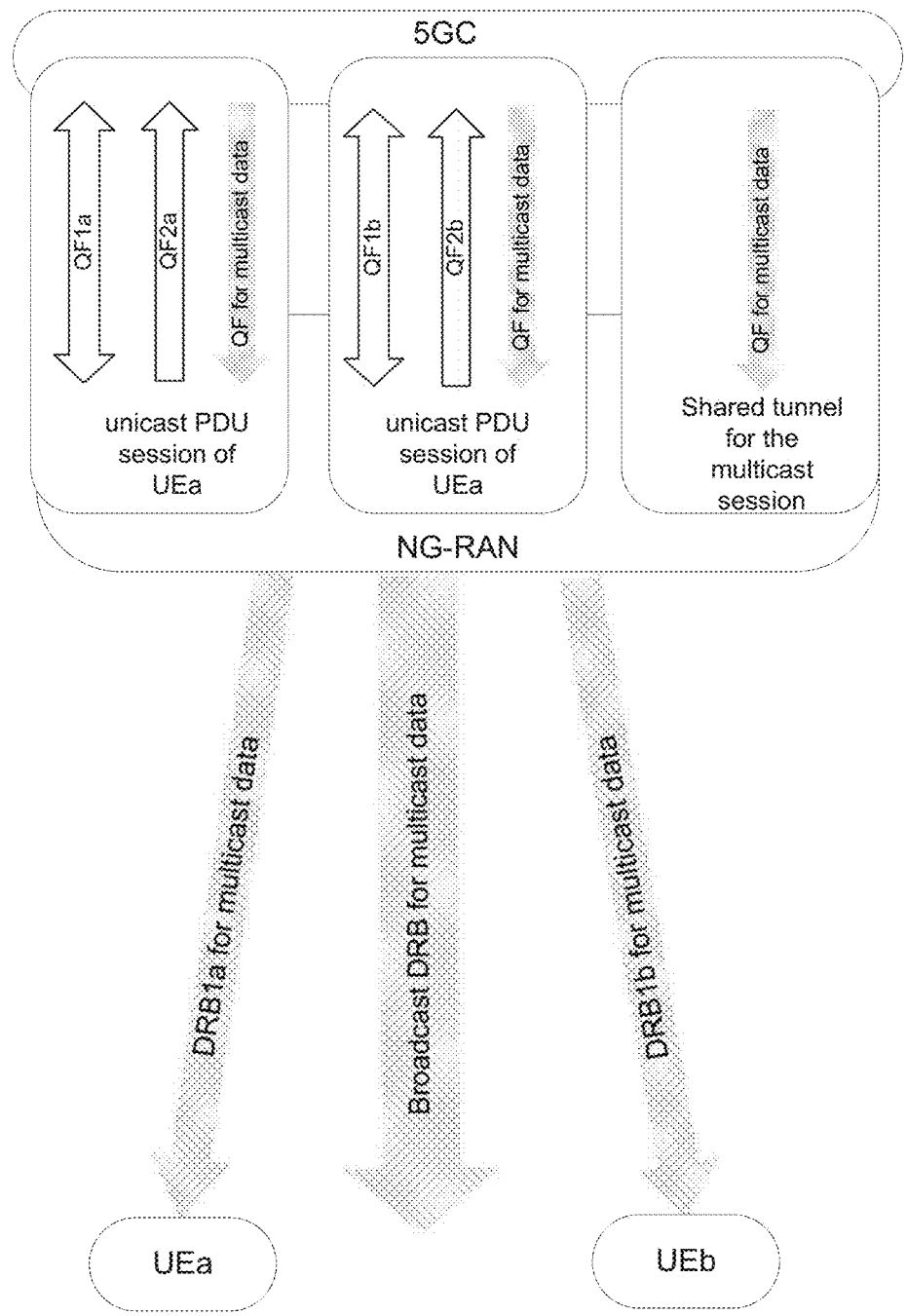
FIG. 5 depicts a process for transferring the multicast service data by a core network (CN) to a radio access network (NG-RAN) based on some example embodiments of the disclosed technology.

FIG. 5 depicts a process for transferring the multicast service data by a core network (CN) to a radio access network (NG-RAN) based on some example embodiments of the disclosed technology.

A first user device UEa has a unicast PDU session, and server unicast QoS flows (e.g., QF1a, QF2a) are established. A second user device UEb has a unicast PDU session, and server unicast QoS flows (e.g., QF1b, QF2b) are established.

The first and second user devices UEa and UEb are in the same group to receive the same multicast service. The first and second user devices UEa and UEb camp on the same NG-RAN.

When the first and second user devices UEa and UEb join the multicast group to receive the multicast data, a core network 5GC determines to establish a shared tunnel to transfer the multicast data. In one example, a session that uses such a shared tunnel may include a multicast session. The core network (e.g., 5GC) also establishes a dummy QoS flow (QF) in the existing unicast PDU session or in a new unicast PDU session for each user device UE that belongs to such a group. The core network (e.g., 5GC) sends the mapping information of the dummy flow in the unicast existing/new PDU session and a flow in shared tunnel to the NG-RAN.

The core network (e.g., 5GC) assigns a QoS flow identifier (QFI) for a new QoS flow and makes sure the uniqueness of the QFI within a PDU session.

When both the dummy flow and the flow (which can be called as MBS flow) in shared tunnel have been established and the multicast data is transferred, the core network 5GC only sends the multicast data in the shared tunnel. When multicast service data arrives in the NG-RAN via the shared tunnel, the NG-RAN decides to use either a unicast data radio bearer (DRB) DRB1a or DRB1b or a broadcast DRB to transfer the multicast service data on the radio interface. The unicast DRB is dedicated to a certain user device UE, whereas all the user devices UEs camping on the cell can receive the data transferred via the broadcast DRB. The NG-RAN can also decide to use both unicast DRB and broadcast DBR. In this case, some user devices UEs (e.g., UEa) can receive the multicast service data via the unicast DRB (e.g., DRB1a) and other user devices UEs camping on the same cell can receive the multicast service data via the broadcast DRB.

In some implementations, as shown in FIG. 5, the unicast data radio bearer DRB1a is the unicast DRB for the first user device UEa and the dummy flow for the multicast data is included in the unicast data radio bearer DRB1a. The unicast data radio bearer DRB1b is the unicast DRB for the second user device UEb and the dummy flow for the multicast data is included in the unicast data radio bearer DRB1b.

Figure 6:
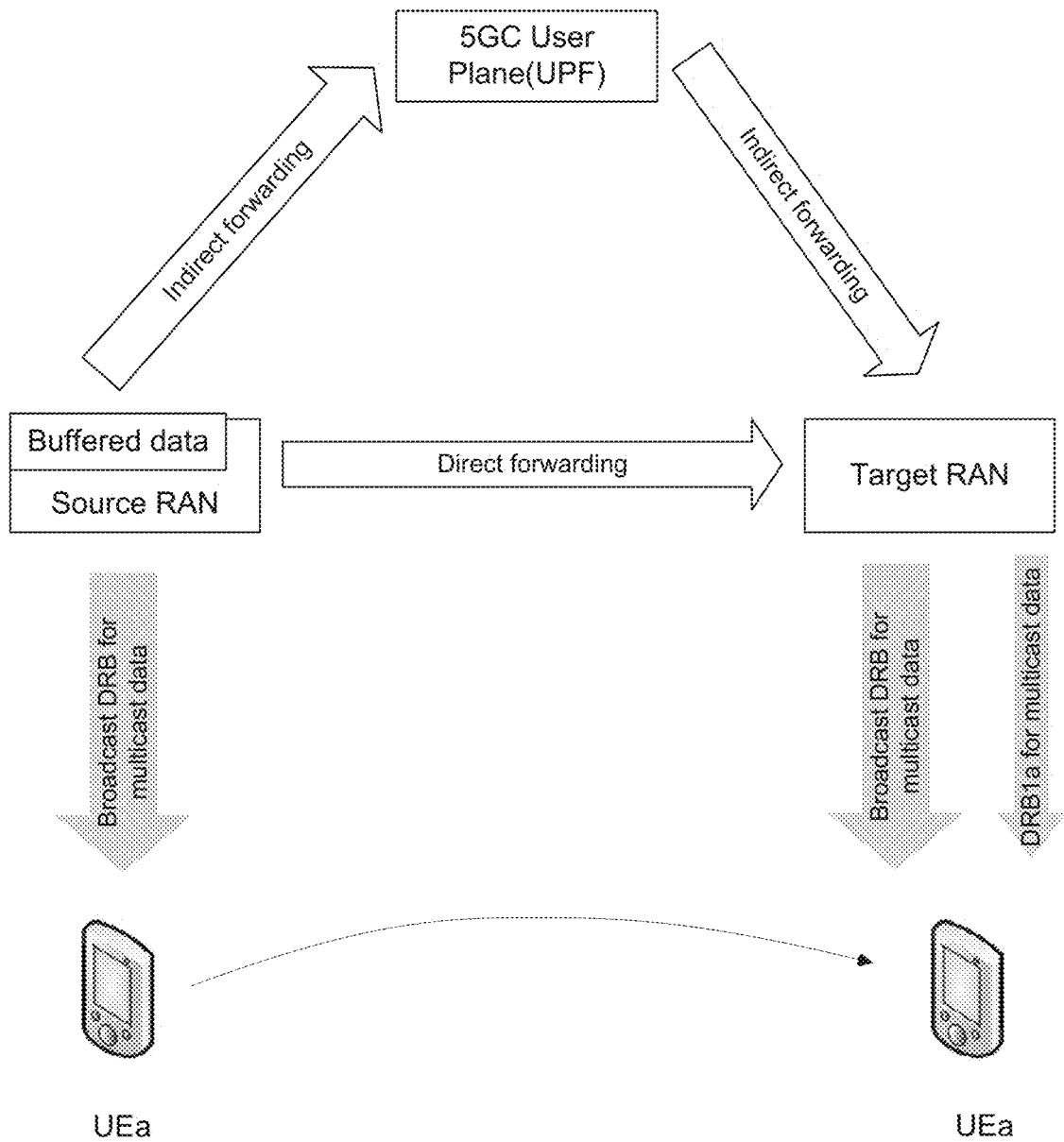
FIG. 6 depicts a process for transferring the multicast service data in a handover procedure based on some example embodiments of the disclosed technology.

FIG. 6 depicts a process for transferring the multicast service data in a handover procedure based on some example embodiments of the disclosed technology.

In a handover situation where the first user device UEa, which has a multicast service in the source RAN, moves from the source RAN to the target RAN, the source RAN may use the broadcast DRB to transfer the multicast service data to all the user devices UEs with such services. When the user device UEa moves to the edge of the coverage of the source RAN, the source RAN decides to handover the user device UEa to the target RAN. There are two different scenarios that can occur in a handover procedure:

Scenario1. In a scenario where the target RAN supports transferring the multicast service data via the broadcast DRB, the target RAN receives the multicast service data via the shared tunnel from the core network 5GC. In one example, the shared tunnel can be established before the user device UEa moves into the coverage of the target RAN. In another example, the shared tunnel can be established during the handover procedure.

When the source RAN decides to handover the user device UEa to the target RAN and the source RAN finds that the user device UEa has multicast service data to receive, the source RAN implemented based on some embodiments of the disclosed technology may buffer the multicast service data and then forward the multicast service data via a direct or indirect tunnel. In some embodiments, when the source RAN forwards the buffered multicast service data, the QFI of the dummy flow in the unicast PDU session, which is mapped to the multicast flow in the multicast session, is added to the multicast service data to replace the identifier of the MBS flow in an encapsulation header of the multicast service data. When the target NG-RAN receives, from the source NG-RAN, the multicast service data identified by the QFI, the target NG-RAN sends the multicast service data received from the source NG-RAN via the unicast data radio bearer DRB1a to the user device UEa.

In some implementations, a radio access network node (NG-RAN) retrieves information for mapping between the identifier of the dummy flow and the identifier of the multicast flow from the core network. The RAN node may also retrieve QoS information from the core network. During the handover procedure, the unicast PDU sessions including the PDU session with the dummy flow will be transferred to the target side and the contexts of such PDU session will be sent to the target NG-RAN. Also the mapping between the MBS flow and the dummy flow is sent to the target NG-RAN during the handover procedure or an MBS session establishment procedure combined with the handover procedure (i.e., the shared tunnel can be established during the handover procedure).

In order for the target NG-RAN to be aware that all the buffered multicast service data has been sent out, the source RAN may generate one or more end markers and forward them to the target RAN via the direct tunnel or indirect tunnel. When the target RAN receives one or more end markers in the direct or indirect tunnel for data forwarding, the target RAN can determine that the buffered multicast service data have been sent out. Upon receipt of the multicast service data through the share tunnel from the 5GC, the target RAN can decide to transfer multicast service data that is not the buffered multicast service data via the broadcast DRB if a broadcast mode on the radio interface is selected. In case of the broadcast mode on the radio interface, the dummy flow included in the unicast DRB may not be scheduled on the radio interface.

In some implementations, the data packets may include (1) multicast service data packets that are buffered in the source RAN and forwarded to the target RAN, and (2) data packets of unicast flows that are received from the core network. If data packets are forwarded from the source RAN to the target RAN, the source RAN generates one or more end markers upon completion of the forwarding of all the data packets. If the data packets are transferred from the core network to the target RAN, the core network generates one or more end markers upon completion of the transmission of the data packets.

In some implementations, the "forwarded" multicast service data, which is buffered in the source RAN and forwarded to the target RAN, is transmitted to the user device UE through a unicast mode. In some implementations, the multicast service data that is received from the core network (not from the source RAN) can be transmitted to the user device UE through a unicast mode or a multicast/broadcast mode.

In some implementations, the end marker may be generated by the core network 5GC to indicate the termination of the buffered packets of unicast flows. However, the core network 5GC transferring the multicast service data in a shared tunnel for a group of user devices UEs may not buffer the packets for a specific UE and generate an end marker to indicate the termination of the buffered packets of multicast flows for a specific user device UE in the group. In some embodiments, the multicast service data for the user device UE in a handover situation is buffered in the source NG-RAN, and thus the end marker is generated by the source NG-RAN to indicate that the buffered multicast service data has been transmitted to the target NG-RAN.

Scenario 2. In a scenario where the target RAN does not support transferring the multicast service data via the broadcast DRB, the dummy flow within the unicast PDU session is used to transfer the multicast service data from the core network 5GC to the use device UE via the target NG-RAN. The target RAN can only use the unicast DRB to transfer the multicast service data. Upon the completion of the handover, there is no shared tunnel and mapping information, and the dummy flow is a normal flow in the target RAN.

FIG. 7 depicts an example of a process 700 for wireless communication based on some example embodiments of the disclosed technology. At 710, the method 700 includes receiving, by a first radio access node (e.g., source NG-RAN), a multicast flow comprising data packets of a multicast service. At 720, the method includes determining, by the first radio access node, whether to initiate a handover procedure for a user device (e.g., UE) from the first radio access node to a second radio access node (e.g., target NG-RAN). At 730, the method includes replacing, upon determination to initiate the handover procedure, by the first radio access node, a first portion of the data packets with a flow identifier (e.g., QFI) of a unicast flow. At 740, the method includes forwarding, by the first radio access node, the data packets of the multicast service including the flow identifier of the unicast flow to the second radio access node.

FIG. 8 shows another example of a process 800 for wireless communication based on some example embodiments of the disclosed technology. At 810, the method 800 includes receiving, by a second radio access node (e.g., target NG-RAN), from a first radio access node (e.g., source NG-RAN), a multicast flow comprising data packets of a multicast service including a flow identifier for a user device during a handover procedure from the first radio access node. At 820, the method includes determining, by the second radio access node, whether the flow identifier indicates a flow for a multicast service. At 830, the method includes transmitting, by the second radio access node, to a user device, the data packets of the multicast service through a unicast flow.

FIG. 9 shows another example of a process 900 for wireless communication based on some example embodiments of the disclosed technology. At 910, the method 900 includes receiving, by a target radio access node, data packets of a multicast service in a handover procedure. At 920, the method includes determining, by the target radio access node, whether the data packets of the multicast service include a quality-of-service (QoS) flow identifier (QFI) indicating that the data packets are forwarded from a source radio access node. At 930, the method includes transmitting, upon determination that the data packets include the QFI, by the target radio access node, the data packets to the mobile device in a unicast mode.

Figure 10:
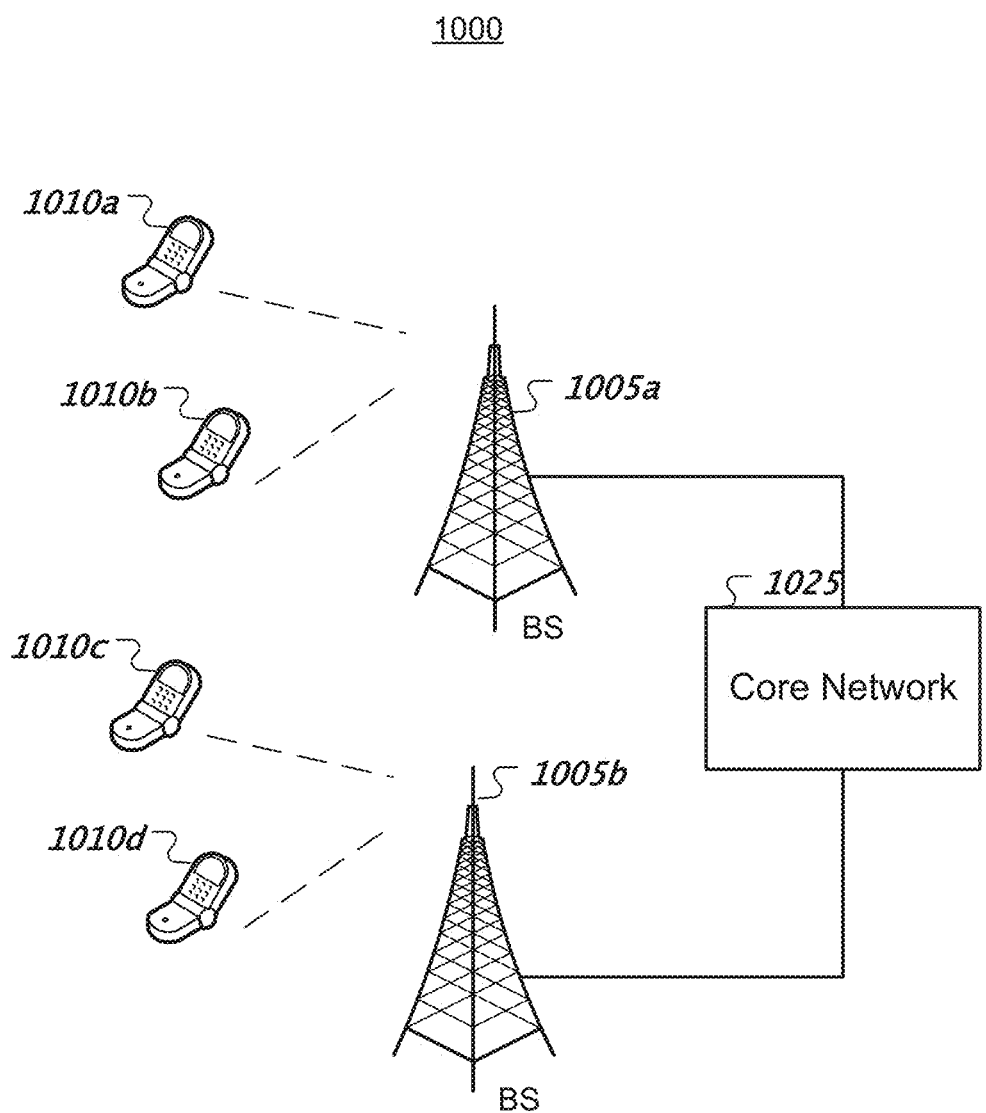
FIG. 10 depicts a wireless communication system based on some example embodiments of the disclosed technology.

FIG. 10 shows an example of a wireless communication system 1000 where techniques in accordance with one or more embodiments of the present technology can be applied. A wireless communication system 1000 can include one or more base stations (BSs) 1005a, 1005b, one or more wireless devices 1010a, 1010b, 1010c, 1010d, and a core network 1025. A base station 1005a, 1005b can provide wireless service to wireless devices 1010a, 1010b, 1010c and 1010d in one or more wireless sectors. In some implementations, a base station 1005a, 1005b includes directional antennas to produce two or more directional beams to provide wireless coverage in different sectors.

The core network 1025 can communicate with one or more base stations 1005a, 1005b. The core network 1025 provides connectivity with other wireless communication systems and wired communication systems. The core network may include one or more service subscription databases to store information related to the subscribed wireless devices 1010a, 1010b, 1010c, and 1010d. A first base station 1005a can provide wireless service based on a first radio access technology, whereas a second base station 1005b can provide wireless service based on a second radio access technology. The base stations 1005a and 1005b may be co-located or may be separately installed in the field according to the deployment scenario. The wireless devices 1010a, 1010b, 1010c, and 1010d can support multiple different radio access technologies. The techniques and embodiments described in the present document may be implemented by the base stations of wireless devices described in the present document.

Figure 11:
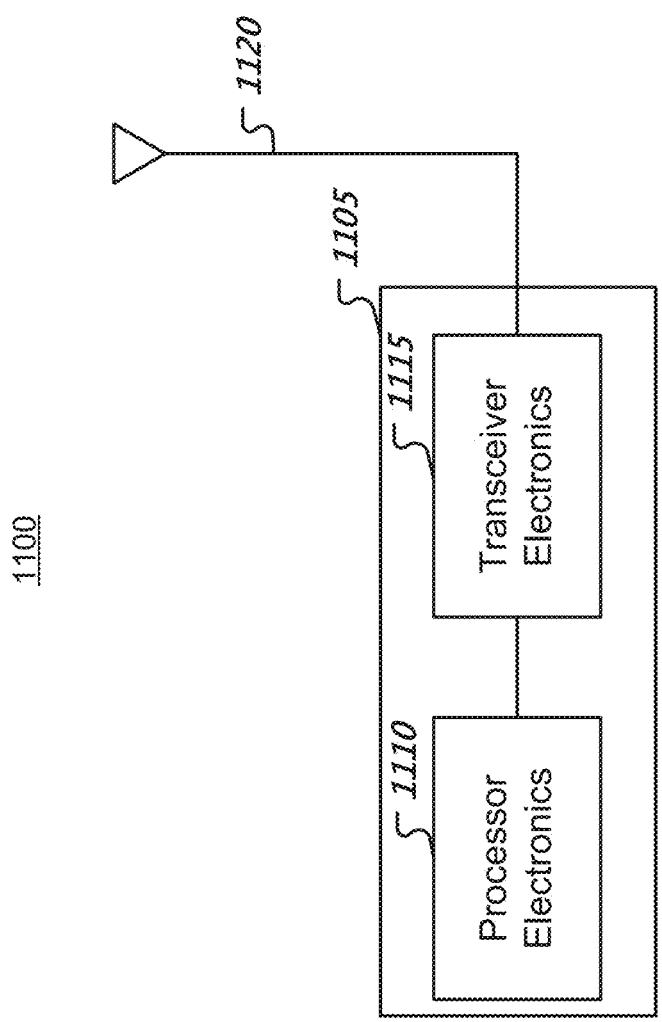
FIG. 11 depicts a block diagram of a portion of a radio system based on some example embodiments of the disclosed technology.

FIG. 11 is a block diagram representation of a portion of a radio station in accordance with one or more embodiments of the present technology can be applied. A radio 1105 such as a base station or a wireless device (or UE) can include processor electronics 1110 such as a microprocessor that implements one or more of the wireless techniques presented in this document. The radio 1105 can include transceiver electronics 1115 to send and/or receive wireless signals over one or more communication interfaces such as antenna 1120. The radio 1105 can include other communication interfaces for transmitting and receiving data. Radio 1105 can include one or more memories (not explicitly shown) configured to store information such as data and/or instructions. In some implementations, the processor electronics 1110 can include at least a portion of the transceiver electronics 1115. In some embodiments, at least some of the disclosed techniques, modules or functions are implemented using the radio 1105. In some embodiments, the radio 1105 may be configured to perform the methods described in this document.

It will be appreciated that the present document discloses techniques that can be embodied in various embodiments to establish and manage multicast sessions in various scenarios. The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Some embodiments may preferably implement one or more of the following solutions, listed in clause-format. The following clauses are supported and further described in the Examples above and throughout this document. As used in the clauses below and in the claims, a wireless terminal may be user equipment, mobile station, or any other wireless terminal including fixed nodes such as base stations. A network node includes a base station including a next generation Node B (gNB), enhanced Node B (eNB), or any other device that performs as a base station. A resource range may refer to a range of time-frequency resources or blocks.

Clause 1. A data communication method, comprising: receiving, by a first radio access node, a multicast flow comprising data packets of a multicast service; determining, by the first radio access node, whether to initiate a handover procedure for a user device from the first radio access node to a second radio access node; replacing, upon determination to initiate the handover procedure, by the first radio access node, a first portion of the data packets with a flow identifier of a unicast flow; and forwarding, by the first radio access node, the data packets of the multicast service including the flow identifier of the unicast flow to the second radio access node.

Clause 2. The method of clause 1, wherein the first portion of the data packets includes an identity of the multicast flow in an encapsulation header of the data packets of the multicast service.

Clause 3. The method of clause 1, further comprising, upon determination to initiate the handover procedure, buffering, by the first radio access node, the data packets of the multicast service for the user device.

Clause 4. The method of clause 3, wherein the first radio access node is further configured to generate one or more end markers upon completion of the forwarding of all the data packets.

Clause 5. The method of clause 1, wherein the forwarding of the data packets of the multicast service to the second radio access node includes transmitting the data packets of the multicast service through a direct tunnel between the first and second radio access nodes.

Clause 6. The method of clause 1, wherein the forwarding of the data packets of the multicast service to the second radio access node includes transmitting the data packets of the multicast service through indirect tunnels between the first radio access node and a user plane function and between the second radio access node and the user plane function.

Clause 7. The method of clause 6, wherein the user plane function is configured to carry a network user traffic.

Clause 8. The method of clause 1, wherein the first radio access node is configured to receive the data packets of the multicast service through a shared tunnel established between a core network and the first radio access node.

Clause 9. The method of clause 1, wherein the first radio access node is configured to receive mapping information between an identity of the multicast flow and a flow identifier of the unicast flow.

Clause 10. The method of any of clauses 8-9, wherein the first radio access node is configured to store the mapping information.

Clause 11. A data communication method, comprising: receiving, by a second radio access node, from a first radio access node, a multicast flow comprising data packets of a multicast service including a flow identifier for a user device during a handover procedure from the first radio access node; determining, by the second radio access node, whether the flow identifier indicates a flow for a multicast service; and transmitting, by the second radio access node, to a user device, the data packets of the multicast service through a unicast flow.

Clause 12. The method of clause 11, further comprising: receiving, by the second radio access node, from a core network, first data packets; determining, by the second radio access node, whether to transmit the first data packets to the user device through the unicast flow or the multicast flow; and transmitting, by the second radio access node, the first data packets to the user device through the unicast flow or the multicast flow based on the determination on the transmission of the first data packets.

Clause 13. The method of clause 11, wherein the receiving of the data packets of the multicast service from the first radio access node includes receiving the data packets of the multicast service through a direct tunnel between the first and second radio access nodes.

Clause 14. The method of clause 11, wherein the receiving of the data packets of the multicast service from the first radio access node includes receiving the data packets of the multicast service through indirect tunnels between the first radio access node and a user plane function and between the second radio access node and the user plane function.

Clause 15. The method of clause 14, wherein the user plane function is configured to carry a network user traffic.

Clause 16. The method of clause 11, wherein, upon determination that the flow identifier indicates a flow for multicast service, a unicast data radio bearer is assigned to the user device for the transmission of the data packets of the multicast service.

Clause 17. The method of any of clauses 1-16, wherein the flow identifier indicating the unicast flow includes a quality-of-service (QoS) flow identifier (QFI) configured to identify a QoS flow.

Clause 18. The method of any of clauses 1-16, wherein the data packets of the multicast service are transmitted through a shared tunnel established between a core network and the first radio access node.

Clause 19. The method of clause 18, wherein the first and second radio access nodes receive mapping information between an identity of the multicast flow transferred in the shared tunnel and the flow identifier indicating the unicast flow.

Clause 20. The method of clause 19, wherein the unicast flow is a dummy quality-of-service flow established by a radio access network within a protocol data unit (PDU) session.

Clause 21. The method of clause 19, wherein at least one of a multicast broadcast session management function (MB-SMF) or a multicast broadcast service function (MBSF) is configured to allocate the QFI for the unicast flow within a protocol data unit session.

Clause 22. The method of clause 21, wherein at least one of the multicast broadcast session management function (MB-SMF) or the multicast broadcast service function (MBSF) is configured to establish a multicast flow in a session for a multicast mode.

Clause 23. The method of any of clauses 21-22, wherein the multicast broadcast session management function (MB-SMF) or the multicast broadcast service function (MBSF) is configured to generate quality-of-service flow parameters and identifiers for the multicast flow and the unicast flow and transfer the generated parameters and identifiers to the radio access nodes.

Clause 24. The method of clause 23, wherein the quality-of-service flow parameters for the multicast flow and the unicast flow are the same as one another.

Clause 25. The method of clause 23, the identifiers for the multicast flow and the unicast flow are different from one another.

Clause 26. The method of clause 23, wherein the first flow is formed on a radio access network between the wireless device and a core network, and the quality-of-service flow parameters for the first quality-of-service flow and the second quality-of-service flow are transferred to the radio access network.

Clause 27. The method of any of clauses 1-26, wherein the first radio access node includes a source radio network and the second radio access node includes a target radio network in the handover procedure.

Clause 28. A data communication method, comprising: receiving, by a target radio access node, data packets of a multicast service in a handover procedure; determining, by the target radio access node, whether the data packets of the multicast service include a quality-of-service (QoS) flow identifier (QFI) indicating that the data packets are forwarded from a source radio access node; and transmitting, upon determination that the data packets include the QFI, by the target radio access node, the data packets to the mobile device in a unicast mode.

Clause 29. The method of clause 28, wherein, upon determination that the data packets include the QFI, the data packets are transmitted via a unicast data radio bearer.

Clause 30. The method of clause 28, further comprising, upon receipt of an end marker in the data packets indicating a completion of the forwarding of the data packets from the source radio access node, transmitting the data packets to the mobile device in a multicast mode.

Clause 31. The method of clause 30, wherein the transmission of the data packets in the multicast mode is performed via a broadcast data radio bearer.

Clause 32. An apparatus for wireless communication, comprising a memory and a processor, wherein the processor reads code from the memory and implements a method recited in any of clauses 1 to 31

Clause 33. A computer readable program storage medium having code stored thereon, the code, when executed by a processor, causing the processor to implement a method recited in any of clauses 1 to 31.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A data communication method, comprising:
   receiving, by a first radio access node, a multicast flow comprising data packets of a multicast service;
   receiving, by the first radio access node, mapping information between an identifier of the multicast flow and a flow identifier of a unicast flow;
   determining, by the first radio access node, whether to initiate a handover procedure for a user device from the first radio access node to a second radio access node;
   replacing, upon determination to initiate the handover procedure, by the first radio access node, the identifier of the multicast flow included in an encapsulation header of the data packets of the multicast service with the flow identifier of the unicast flow configured to identify a unicast quality-of-service (QoS) flow; and
   forwarding, by the first radio access node, the data packets of the multicast service including the flow identifier of the unicast flow to the second radio access node.

2. The method of claim 1, further comprising, upon determination to initiate the handover procedure, buffering, by the first radio access node, the data packets of the multicast service for the user device.

3. The method of claim 1, wherein the forwarding of the data packets of the multicast service to the second radio access node includes transmitting the data packets of the multicast service through a direct tunnel between the first and second radio access nodes.

4. The method of claim 1, wherein the forwarding of the data packets of the multicast service to the second radio access node includes transmitting the data packets of the multicast service through indirect tunnels between the first radio access node and a user plane function and between the second radio access node and the user plane function.

5. The method of claim 1, wherein the first radio access node is configured to receive the data packets of the multicast service through a shared tunnel established between a core network and the first radio access node.

6. The method of claim 1, wherein the data packets of the multicast service are transmitted through a shared tunnel established between a core network and the first radio access node.

7. An apparatus for wireless communication, comprising processor electronics configured to cause the apparatus to implement the method of claim 1.

8. A data communication method, comprising:
   receiving, by a second radio access node, from a first radio access node, a multicast flow comprising data packets of a multicast service including a flow identifier for a user device during a handover procedure from the first radio access node;
   determining, by the second radio access node, whether the flow identifier indicates a flow for a multicast service; and
   transmitting, by the second radio access node, to the user device, the data packets of the multicast service through a unicast flow, wherein, upon determination to initiate the handover procedure, a first portion of the data packets is replaced with a flow identifier of the unicast flow, wherein, upon determination to initiate the handover procedure, an identifier of the multicast flow included in an encapsulation header of the data packets of the multicast service is replaced with a flow identifier of the unicast flow configured to identify a unicast quality-of-service (QoS) flow based on mapping information between an identity of the multicast flow and the flow identifier of the unicast flow received by the second radio access node.

9. The method of claim 8, further comprising:
receiving, by the second radio access node, from a core network, first data packets;
determining, by the second radio access node, whether to transmit the first data packets to the user device through the unicast flow or the multicast flow; and
transmitting, by the second radio access node, the first data packets to the user device through the unicast flow or the multicast flow based on the determination on a transmission of the first data packets.

10. The method of claim 8, wherein the receiving of the data packets of the multicast service from the first radio access node includes receiving the data packets of the multicast service through a direct tunnel between the first and second radio access nodes.

11. The method of claim 8, wherein the receiving of the data packets of the multicast service from the first radio access node includes receiving the data packets of the multicast service through indirect tunnels between the first radio access node and a user plane function and between the second radio access node and the user plane function.

12. The method of claim 8, wherein, upon determination that the flow identifier indicates a flow for multicast service, a unicast data radio bearer is assigned to the user device for a transmission of the data packets of the multicast service.

13. The method of claim 8, wherein the data packets of the multicast service are transmitted through a shared tunnel established between a core network and the first radio access node.

14. The method of claim 8, wherein the first radio access node includes a source radio network and the second radio access node includes a target radio network in the handover procedure.

15. An apparatus for wireless communication, comprising processor electronics configured to cause the apparatus to implement the method of claim 8.

16. A data communication method, comprising:
receiving, by a target radio access node, data packets of a multicast service in a handover procedure;
determining, by the target radio access node, whether the data packets of the multicast service include a quality-of-service (QoS) flow identifier (QFI) indicating that the data packets are forwarded from a source radio access node; and
transmitting, upon determination that the data packets of the multicast service include the QFI, by the target radio access node, the data packets to a mobile device in a unicast mode,
wherein, upon determination to initiate the handover procedure, a first portion of the data packets is replaced the QFI,
wherein, upon determination to initiate the handover procedure, an identifier of a multicast flow included in an encapsulation header of the data packets of the multicast service is replaced with the QFI, based on mapping information between the identifier of the multicast flow and a flow identifier of the unicast mode received by the target radio access node.

17. The method of claim 16, wherein, upon determination that the data packets include the QFI, the data packets are transmitted via a unicast data radio bearer.

18. The method of claim 16, further comprising, upon receipt of an end marker in the data packets indicating a completion of the forwarding of the data packets from the source radio access node, transmitting the data packets to the mobile device in a multicast mode.

19. An apparatus for wireless communication, comprising processor electronics configured to cause the apparatus to implement the method of claim 16.

* * * * *